Jan. 16, 1968 F. C. DONOFRIO ET AL 3,364,395

MODULAR DATA PROCESSING APPARATUS INCLUDING HEAT DISSIPATING MEANS

Filed Jan. 26, 1965 8 Sheets-Sheet 1

INVENTORS.
FRANK C. DONOFRIO
WALTER H. MARSHALL
FRANCIS V. SABATINO
RICHARD A. STOTLER

Carl Fissell Jr.
AGENT

INVENTORS.
FRANK C. DONOFRIO
WALTER H. MARSHALL
FRANCIS V. SABATINO
RICHARD A. STOTLER
Carl Fissell Jr.
AGENT INVENTORS.
FRANK C. DONOFRIO
WALTER H. MARSHALL
FRANCIS V. SABATINO
RICHARD A. STOTLER
Carl Fissell Jr.
AGENT INVENTORS.
FRANK C. DONOFRIO
WALTER H. MARSHALL
FRANCIS V. SABATINO
RICHARD A. STOTLER Carl Fissell Jr.
AGENT INVENTORS.
FRANK C. DONOFRIO
WALTER H. MARSHALL
FRANCIS V. SABATINO
RICHARD A. STOTLER Carl Fissell Jr.
AGENT INVENTORS.
FRANK C. DONOFRIO
WALTER H. MARSHALL
FRANCIS V. SABATINO
RICHARD A. STOTLER
Carl Fissell Jr.
AGENT

United States Patent Office 3,364,395

Patented Jan. 16, 1968

3,364,395

MODULAR DATA PROCESSING APPARATUS INCLUDING HEAT DISSIPATING MEANS

Frank C. Donofrio, Norristown, Walter H. Marshall, Media, and Francis V. Sabatino, King of Prussia, Pa., and Richard A. Stotler, New Castle, Del., assignors to Burroughs Corporation, Detroit, Mich., a corporation of Michigan Filed Jan. 26, 1965, Ser. No. 428,156
15 Claims. (Cl. 317—100)

ABSTRACT OF THE DISCLOSURE

The present invention relates to a micro miniaturized integrated modular high speed data processing apparatus in which the individual modules are easily and efficiently interchangeable with each other and wherein the integrated circuit mounting structure comprises a separable demountably pluggable unitized assembly. Each such assembly is provided with a multiwalled receptacle for receiving an accordion pleated wiring member on which are mounted in separable spaced side by side arrangement individual integrated circuit component members. The individual support members carrying the rows of modules are arranged in parallel pairs so that the modules of one support member are offset from and nested between adjacent rows of modules on the confronting printed wiring member. Each printed wiring module includes a common planar heat-sink-ground-plane member operably associated therewith providing means for interconnection to the heat sink ground plane members of each pluggable member for dissipating thermal energy while simultaneously providing electrical ground potential levels for such apparatus.

The present invention relates to data processing apparatus, and, more particularly, although not necessarily exclusively, to micro-miniaturized, integrated type, high speed data processing apparatus. With still more particularity, the present invention has to do with automatic data processing apparatus employing individual modules which are common to one another and thus easily, simply and efficiently, interchangeable or replaceable one with another, thus facilitating inter-operational structural combination as well as simplifying operation, maintenance and repair.

Still more specifically, the present invention has to do with general purpose, solid state, high speed computing apparatus employing integrated circuits exclusively for logic implementation, thus achieving digital data processing apparatus that is compact, light in weight, reliable and of relatively low power consumption.

It is an important object of the present invention therefore to provide new and novel micro-miniaturized low-cost, light weight, digital data processing apparatus.

Another object of the invention is to provide modular data processing system apparatus comprising a minimal number of functionally and physically independent electronic circuit modules.

Still another object of the invention is to provide compact modular data processing apparatus employing demountable, pluggable, interchangeable, electronic circuit assemblies which can be combined and interconnected electrically to form a large number of varying types of data processing systems.

It is also an object of the invention to provide an encapsulated integrated electronic circuit assembly package for mounting on a printed wiring member thus facilitating and simplifying maintenance and repair.

Another object of the invention is to provide a unitary pluggable printed wiring assembly including a heat sink and ground plane for operable association with other circuit components and assemblies.

Still another object of the invention is the provision of a common ground plane and heat sink for encapsulated circuit modules operably interconnectible with a common ground plane and heat sink of an associated printed wiring board assembly.

In accordance with the foregoing objects and first briefly described, the present invention comprises, micro-miniaturized electronic data processing apparatus including, an integrated circuit central data processor, a memory unit of thin film or magnetic core type, an input-output control module employing integrated and discrete component circuitry, an integrated circuitry memory switch module, and a solid state power supply module. Each of the foregoing modules is demountably, pluggably receivable on a base frame member to which each is electronically and mechanically interlocked for operative electrical association in the performance of automatic data processing of arithmetic and other information.

Another aspect of the present invention is the utilization of an encapsulated integrated electronic circuit package in which a flexible printed wiring member carrying a plurality of integrated circuit packages, e.g., flat packs, and associated heat sink members is folded back and forth upon itself in accordion-like fashion and thereafter inserted into a comb-like insulating frame support. Each tooth of the comb-like frame has embedded pins therein which project away therefrom for contacting the printed wiring circuit assembly, thus bringing all of the circuit input leads to a common area, enabling the use of dip soldering techniques in order to make all connections in one operation. Wiring between the individual integrated circuit modules is facilitated by the employment of a larger "mother" board consisting of a two sided printed wiring assembly with an electrically conductive heat dissipating panel member on its top surface. Heat sink tabs from the miniaturized electronic circuit modules are electrically and mechanically connected to this larger heat sink panel. Pairs of the "mother" boards comprise an assembly which is demountably, pluggably, associated with a larger supporting container member also demountably, pluggably, associated with the base frame of the data processing apparatus.

Additional features and advantages of the invention will become more apparent from the detailed description and the accompanying drawings in which.

Figure 1:
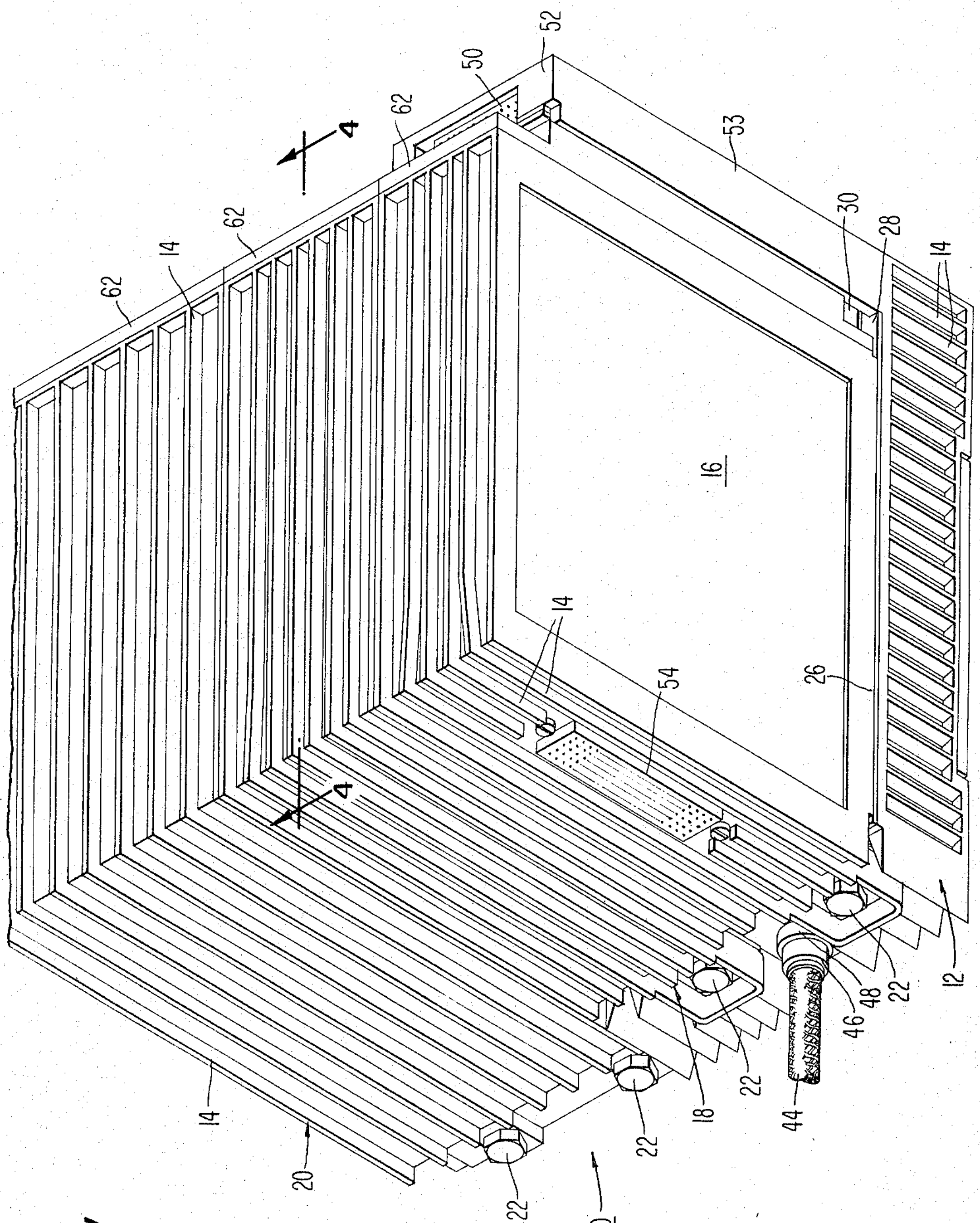
FIGURE 1 is an isometric view of modular data processing apparatus embodying the present invention.

In order to provide widespread general use of automatic data processing equipment it is important that the equipment be constructed of common building blocks, e.g., electrical circuit assemblies, thereby simplifying logistic and training problems and also permitting the use of common software based on the building block principle. Of equal importance is that the ultimate in reliability be achieved in such a system, so that a minimum of so-called "down-time" is encountered with field use of the apparatus. The present apparatus is a general purpose, solid state, high speed computing system and employs integrated circuits exclusively for logic implementation, thus achieving digital data processing apparatus for a myriad of applications that is compact, reliable, lightweight, and of low power consumption.

The present computing system apparatus may, in general, comprise five types of functionally and physically independent modules: (a) a central data processor module employing monolithic integrated circuits; (b) a memory module employing various circuitry combinations of thin film components, integrated components or discrete components for a variety of functional operations, including non-destructive readout memory employing thin film storage techniques and non-destructive readout memory or destructive readout memory employing toroidal core storage techniques; (c) input-output interface control module; (d) a memory switch module and (e) a power supply module. By forming physical and electrical combinations of these modules, a multiplicity of electrical circuit configurations can be obtained so as to produce a truly flexible computer system capable of both parallel and multi-processing and including concurrent computations thereby satisfying a wide spectrum of both commercial and military applications and requirements.

The data processing system apparatus of this invention comprises a completely modular assembly with the memory, input-output interface control, switch control apparatus, the central data processor and power supply apparatus in separate, sealed package assemblies, as hereinafter described in detail. In the present instance, the power supply module is configured to provide a base frame supporting the other assemblies. Each package assembly is structurally independent for ease of handling and forms an integral part of the computer unit when assembled therewith. The apparatus as constructed makes provision for modular expansion of memory and/or input-output capacity without the need for involved and often costly structural alterations to the system configuration.

The exceptionally small physical size of the present basic computer system apparatus is made possible through the use of circuit network assemblies employing integrated circuit elements. A circuit network module consists of a pin header assembly and a flexible dielectric strip containing a printed circuit onto which the individually packaged integrated circuits are attached. The integrated circuit packages are or may be parallel gap-welded or resistance soldered to the printed circuit strips and this assembly is then inserted into the pin header to form a circuit network module. The assembly steps for the novel modular construction are described in detail hereinafter.

The central data processor apparatus module (CDP) constitutes a basic building block of the present computer system. It includes two functional areas; the arithmetic unit and the program execution control. The program execution control includes the memory addressing control, the interrupt control logic and the control logic for data transfer between the control data processor and the input-output modules.

All inputs and outputs to the computer system are via the input-output interface control module (I/O IC). The number and type of I/O interface modules used in a given system configuration are determined by the application and the peripheral equipment employed. The I/O interface control, being designed for a specific application, permits a highly flexible design in that only as many circuits as are needed are actually built into the unit. The logic in the I/O interface control module is implemented using monolithic integrated circuits, in the same manner as the control data processor.

The module deign of the present data processing system enables it to operate effectively and efficiently with broadly expansible memory complements. Hence, it is designed for operation in systems having different memory sizes and configurations without requiring corresponding changes in the central data processor logic.

The memory switch module is a logic unit which provides automatically controlled high speed channels for the transfer of addresses and data between several memory modules and the central data processor. The present apparatus permits concurrent computation, and hence more than one memory module may be accessed at any given time.

The power supply module is housed in the base of the modular structure as described later on herein. A variation housing the power supply in a module similar to the CDP and I/O, also designed for mounting to a base essentially as described herein is also a part of this invention.

Referring first to FIGURE 1 of the drawings, wherein a preferred basic embodiment of the invention is shown, high speed digital data processing system apparatus 10 is seen to include a base 12, e.g., die casting or other suitable rigid material provided with external cooling fins 14 disposed around the peripheral surface portion thereof. A suitable power supply, not otherwise identified, is housed in base 12. Three independent functionally, separate system components including an input-output module 16, a central data processor module 18 and a memory module 20, each provided with cooling fins 14 are adapted to be mounted upon the base 12 and secured thereto in the manner described hereinafter, as by captivated shear bolts 22.

Figures 3, 3A:
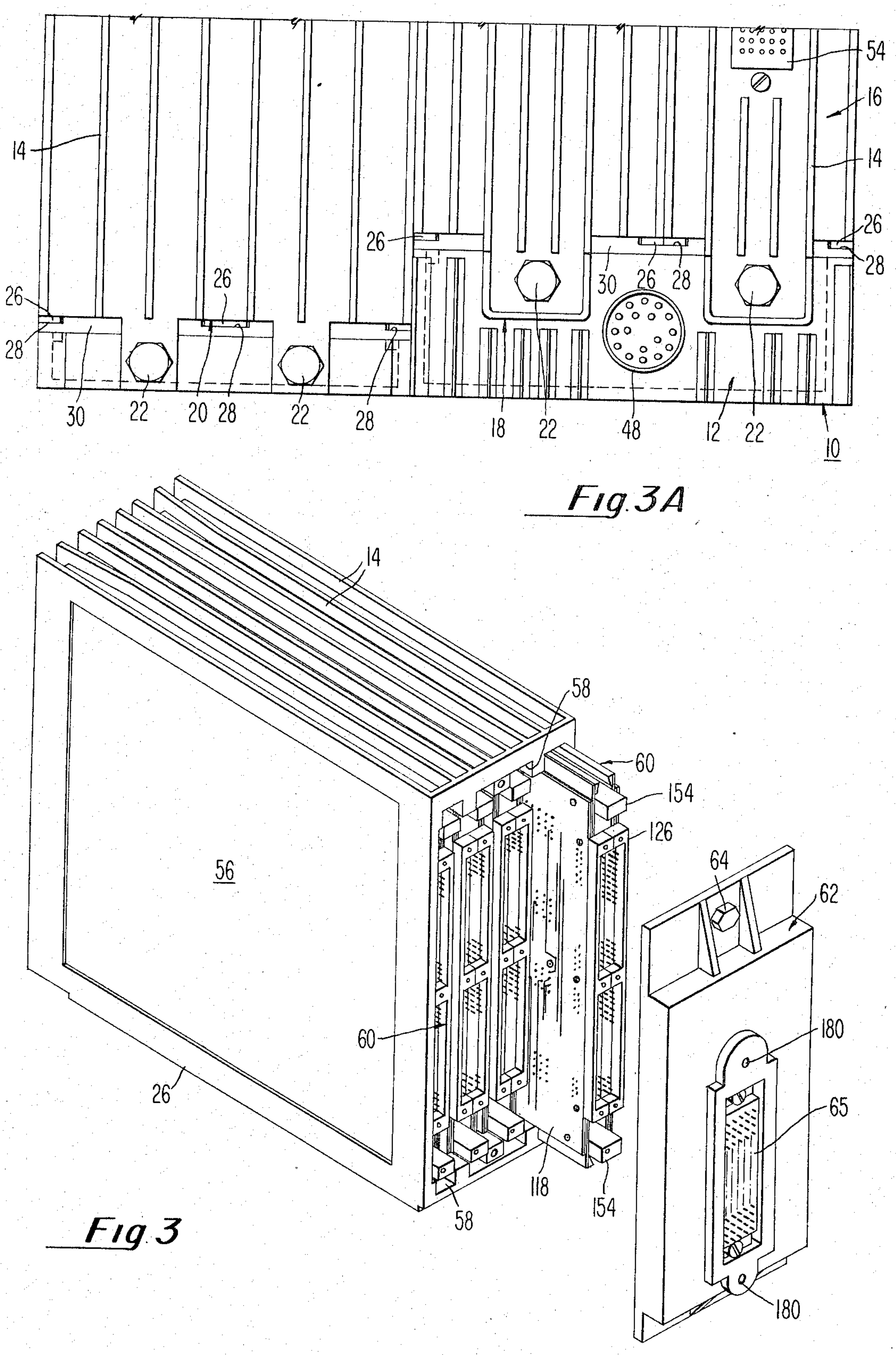
FIGURE 3 is an isometric view of a demountable, pluggable, modular container member for use with the apparatus of FIGURE 1.
FIGURE 3A is a partial front view of the apparatus of FIGURE 1.

The base of modules 16, 18 and 20 are each provided with oppositely disposed, parallel, integrally formed rails or guides 26—26, FIGURES 3 and 3A, permitting these members to be slidable along complementary grooves or tracks 28—28 on the upper surface portions of covers 30—30 for base 12, the latter being affixed to the base as by bolts 32.

Each of the modules is demountably, pluggably, engageable with a respective one of the female connectors 34, 36 and 38 secured, as by bolts, to the rear inner wall member 40. Fixed alignment shear pins 42 located on the rear inner wall 40 provide rigid mounting and support for the associated module while also restraining the modules in the transverse and vertical modes. This mechanical arrangement not only prevents accidental dislodgment but also aligns the mating connectors upon insertion of the modules upon the base 12.

Figure 2:
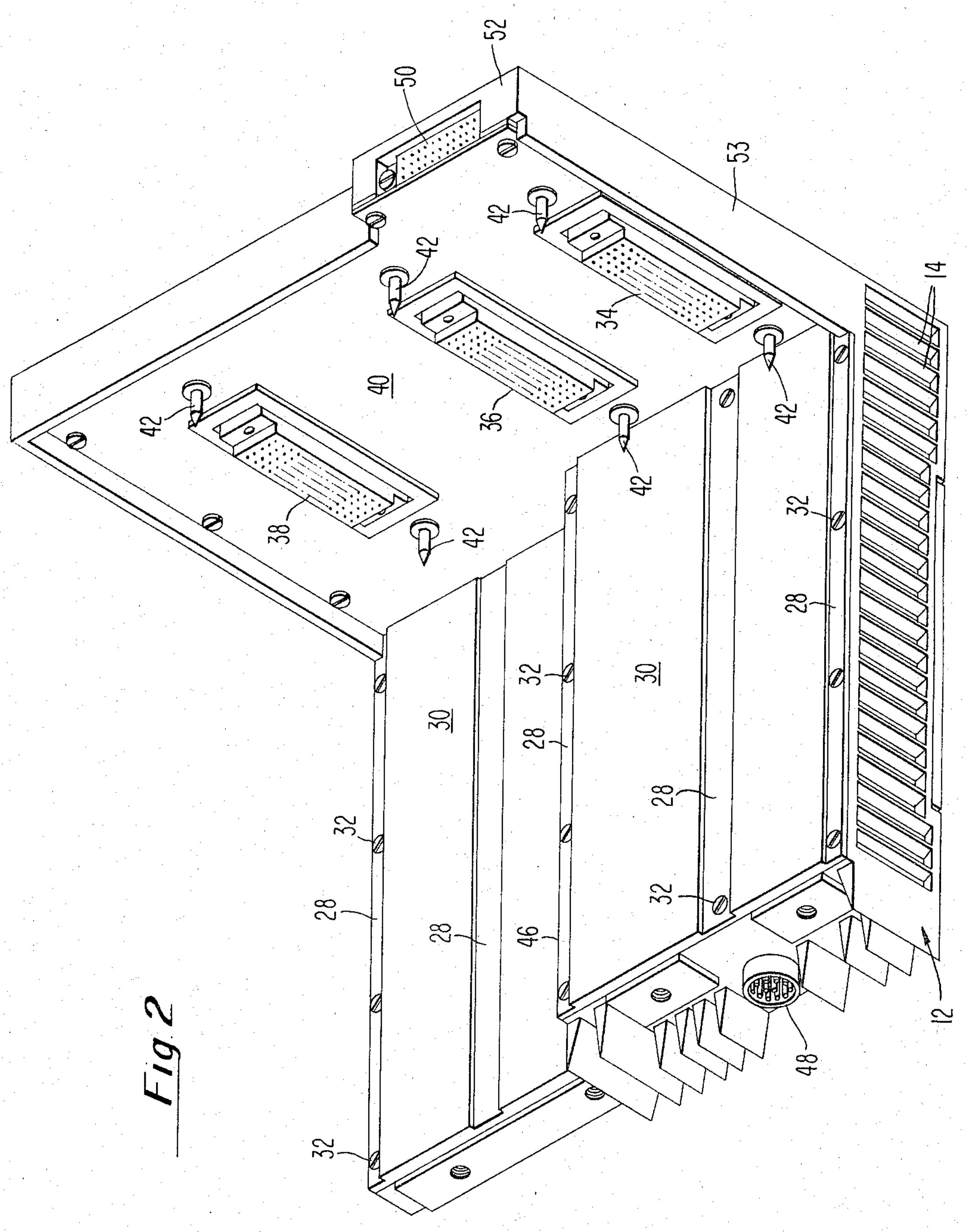
FIGURE 2 is an isometric view of a base frame supporting member for the apparatus of FIGURE 1.

Electrical potential from a suitable source of supply is brought into the apparatus 10 via a cable 44, plug 46, and female connector 48, FIGURE 1. A female connector 50 recessed in the rear upstanding ledge 52 of the end wall, FIGURE 2, provides, among other things, test indicator signal application means for use in checking the apparatus as desired or required. A recessed female connector 54 secured to the front of the basic input-output module 16, as by bolts, provides signal information data input means for introducing data into and removing data from the system apparatus 10.

In the foregoing manner various subcomponent modules of the present data processing apparatus are or may be assembled into a unitary structure as seen in FIGURE 1 and maintained in this assembled condition without danger of accidental loss or dislodgment of any of such subassemblies or misalignment or misplacement of one assembly for another, if, as and when service or repair is called for.

As is readily apparent from FIGURES 1, 2 and 3 hereinabove described, heat dissipating fins 14 provided on exposed surfaces of the base frame assembly 12 and on the modular assemblies 16, 18 and 20, dissipate any heat which may be produced during operation of the apparatus.

Each of the modules 16, 18 and 20 is, with certain exceptions, more or less constructed substantially identical to the module 16, shown in FIGURE 3. As hereinafter noted each module takes the form of a rigid, structural body member, e.g., die casting which is shaped in the form of a rectangular container 56, FIGURE 3, with the heat dissipating-cooling fins 14 disposed on the top and front (left in FIGURE 3) surfaces as shown. The bottom surface of each container module carries the aforementioned guide rails 26—26 along opposite parallel edge portions also the center of member 20. The interior of the member 56 is provided with upper and lower sets of parallel spaced grooves 58—58 permitting varying numbers of module card assemblies 60, the construction of which will be described hereinafter, to be slidably, demountably, pluggably received therewithin, as is described later on herein. A closure member 62 including upper and lower captive securement fasteners or bolts 64 secures member 62 to container 56, FIGURE 3, thereby effectively sealing the same from the atmosphere. A combination radio frequency interference or environmental sealing gasket (not shown) may be employed as required. A male connector 65 is secured to the member 62 as by bolts completing the container assembly and permitting the same to be pluggably attached to its mating receptacle on the base member 12.

Figure 4:
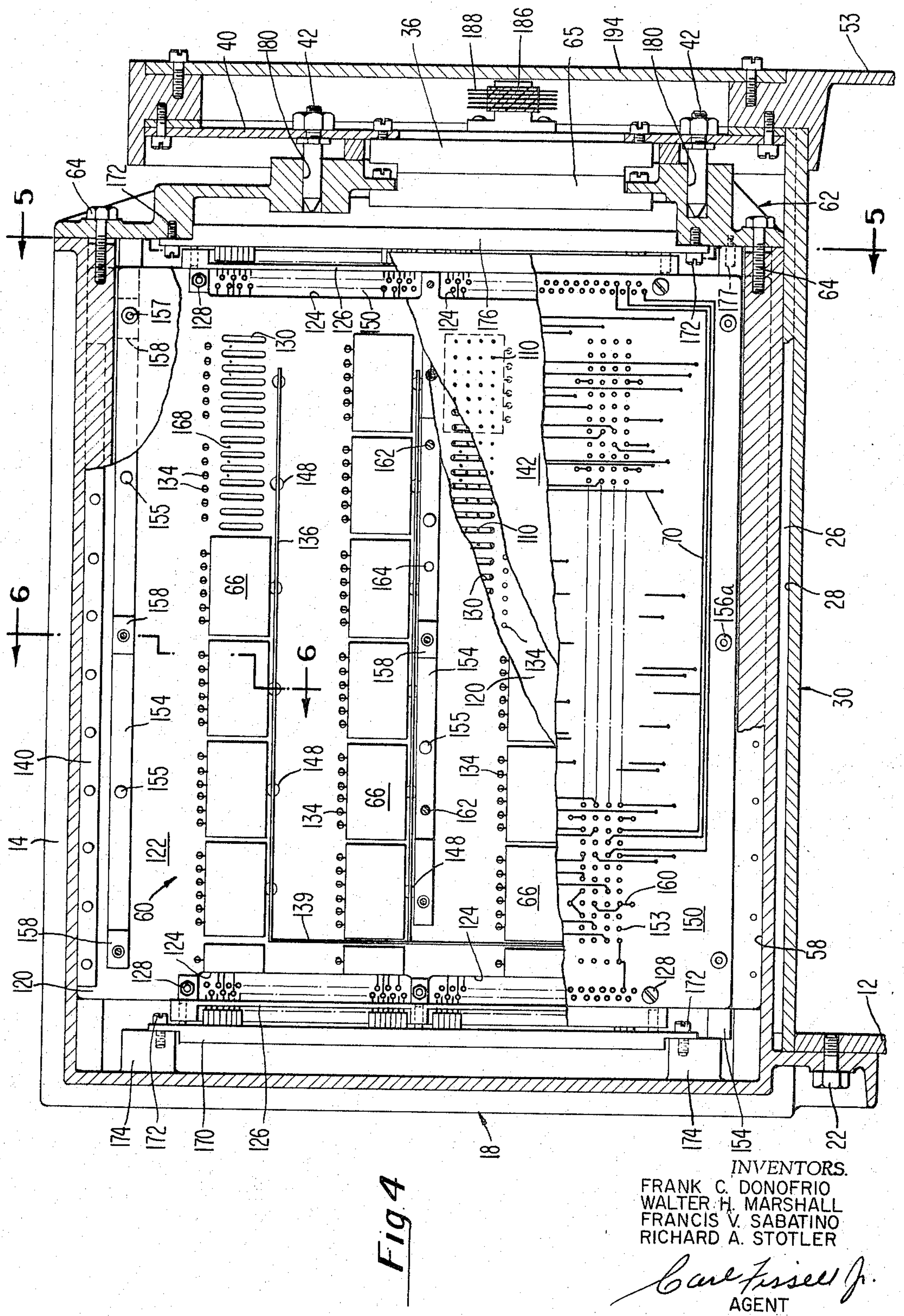
FIGURE 4 is a view along the line 4—4 of FIGURE 1 illustrating a demountable, multiple circuit network module board assembly of the apparatus of FIGURE 1 with portions broken away to expose the interior construction thereof to view.

The module card assembly 60, a composite unitary pluggable assembly, includes a number of associated electrical and mechanical component assemblies and assorted individual components, as will now be described. Reference is first briefly made to FIGURE 4 where it can be seen that the circuit assembly package 60 includes, among other things, a plurality of micro-miniature basic circuit network modules 66. Each module 66 is adapted to be pluggably receivable in suitable apertures not shown for operative electrical and mechanical association with printed wiring 70, described hereinafter, in such a manner as to permit the circuit modules 66 to operate effectively as independent although electrically interconnected circuit subassemblies. The construction of the unitary assembly shown most clearly in FIGURE 4 will be described in detail hereinafter.

Attention is now directed to the basic circuit network module 66, the structural configuration of which is illustrated in FIGURES 7 to 14 inclusive. As before mentioned, the central data processor 18 is comprised of a plurality of module card assemblies 60 each circuit network module board or card of which includes a plurality of individual, encapsulated, integrated circuit package modules 66. As many as 12 integrated circuit packages may be employed in each of the circuit modules 66.

Figure 7:
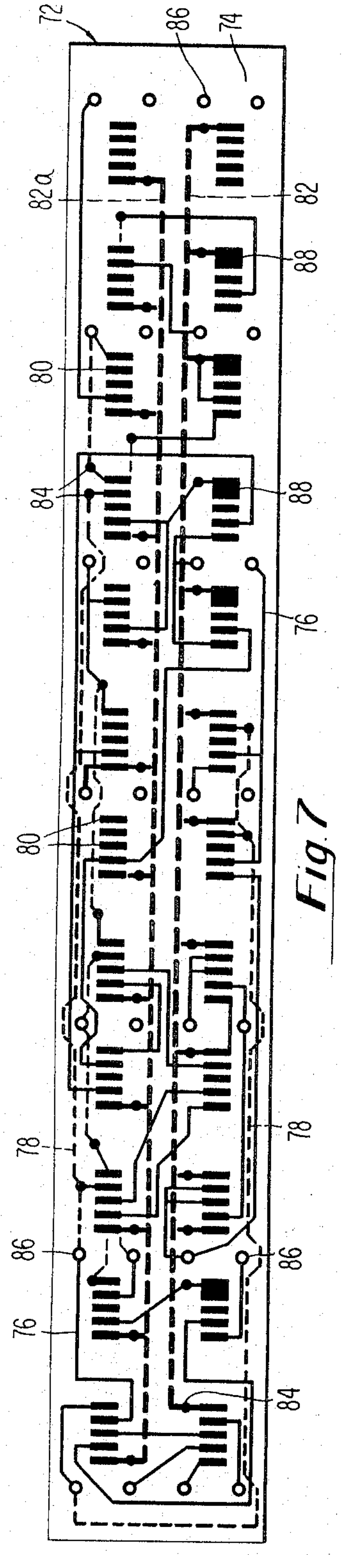
FIGURE 7 is a plan view of a miniature printed wiring strip subassembly for the micro-miniaturized module of the present invention.

As seen particularly in FIGURE 7, of the drawings, a printed wiring subassembly 72 is seen to include a relatively thin, elongated, narrow strip of dielectric material 74 on the obverse and reverse or front and rear surfaces of which there is provided a series of conductors 76 and 78 respectively, forming interconnecting circuitry for individual integrated circuit packages which will be described hereinafter. The front surface i.e., that surface directly facing the viewer, is provided with a plurality of groups of conductive pads 80 disposed in parallel spaced apart arrangement with each group including five printed conductors 80, or more or less as required by the integrated circuit package specifically employed. Individual conductive busses 76 or 78 interconnect certain of the pads 80, in a prearranged wiring schematic pattern. A pair of relatively wide conductive busses 82–82*a* disposed on the reverse or back side of member 74 are employed to provide ground plane connection and electrical potential interconnecting means, respectively, for applying suitable electrical potentials to the circuits, as hereinafter described. The heavy busses 82–82*a* are brought out through interconnecting conductive crossover points 84 from the reverse to the obverse side of member 74 and are suitably arranged so as to connect with one or more of the conductors 76 and 78. Through holes 86, previously conductively plated, provide conductive junction connectors for interconnecting the circuit of each module with the printed wiring 70, FIGURE 4, as hereinafter described.

The through holes 86 are arranged in an orderly repeating pattern, four to a row, seven rows to each dielectric member 74, twenty-eight through holes total for purposes to be described presently. In certain instances certain of the conductive pads 84 are joined together forming a larger conductive pad such as that indicated by reference character 88.

Figure 8:
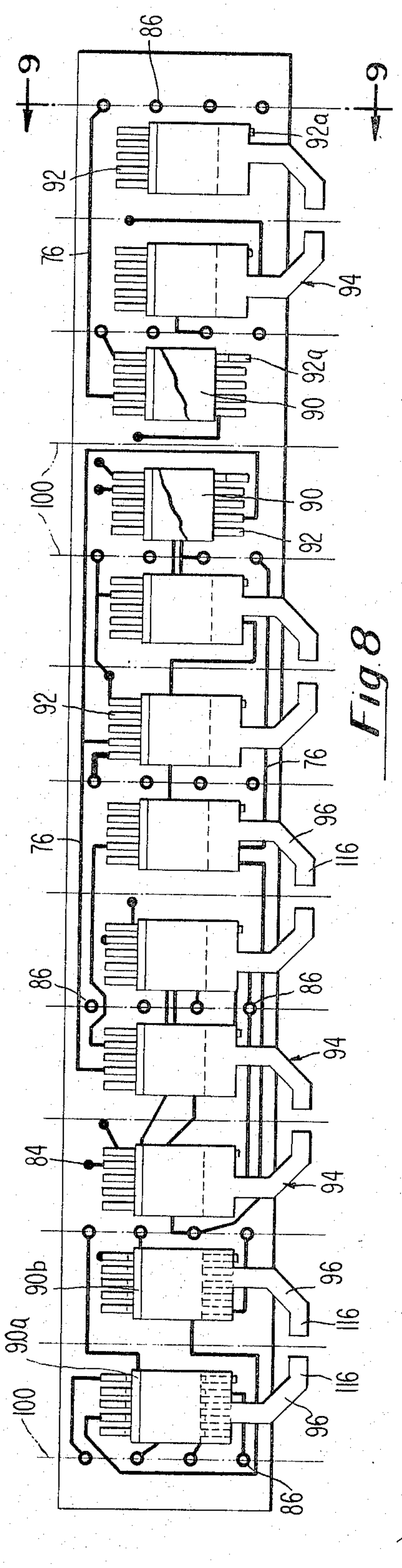
FIGURE 8 is a view similar to FIGURE 7 and including electronic integrated circuit package members and heat sink and ground plane assemblies therefor.
Figure 9:
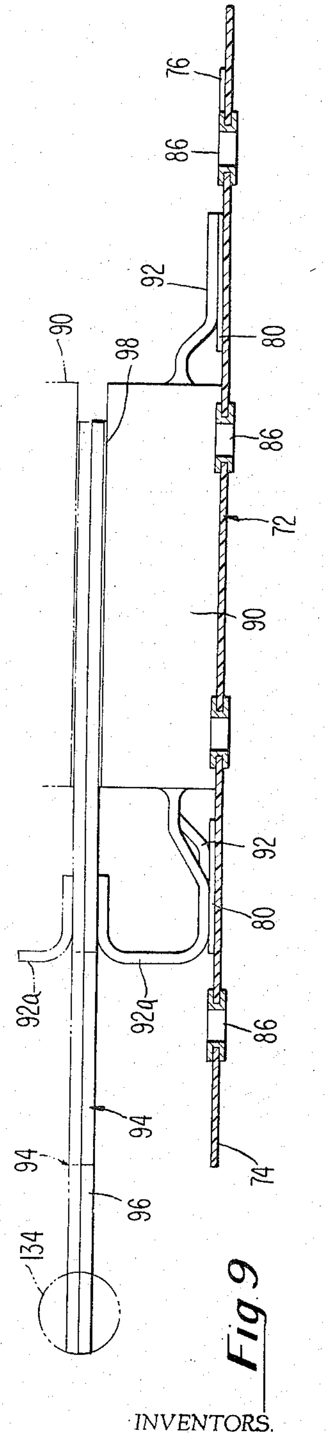
FIGURE 9 is a partial sectional view along the line 9—9 of FIGURE 8.
Figure 10:
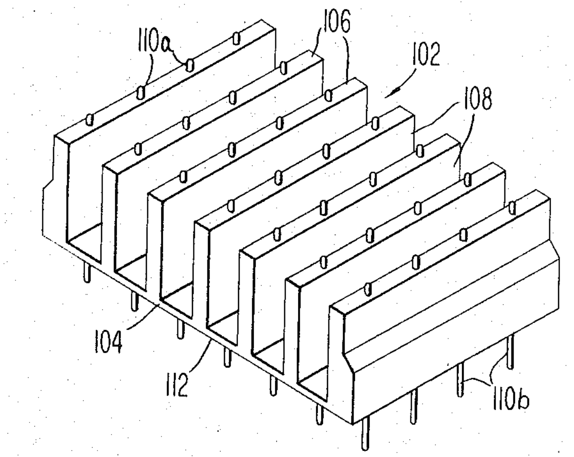
FIGURE 10 is an isometric view of a comb-like module assembly embodying the present invention.

As seen with reference to FIGURE 8, individual integrated circuit components hereinafter described as "flat packs" 90, including one or more circuits or circuit combinations, are disposed on the member 74 so that the leads 92 register with respective pads 88. Thereafter the individual leads are electrically and mechanically secured to the pads 88 in suitable fashion as by soldering or welding. A ground plane-heat sink member 94 is secured over the top surface of each flat pack 90 so that the integral irregularly shaped interconnecting tab 96 on one member 94 is oriented toward the next adjacent tab, for purposes which will become clear hereinafter.

The heat sink members are or may be part of a longer relatively thin, narrow, sheet of metallic material such as Phosphor bronze, beryllium copper, etc. which is etched in the pattern shown. The interconnecting web portions (not shown) remaining are then removed as by cutting to leave only the members 94 for exact registration with the upper flat surface of the "flat pack" with which each is operably associated. A thermal-mechanical attachment securely bonding each heat sink 94 to its respective flat pack is accomplished by means of suitable cement 98, FIGURE 9, after which the ground lead 92*a* is electrically connected to the indicated pad 80 or 88 as by soldering or parallel gap welding and then bent back upon itself and soldered to its associated heat sink tab 96. The member 74 is now accordion pleated back and forth upon itself as in FIGURE 13, folding being accomplished along the dashed lines 100 in a manner such that the heat sinks 94 of pairs of flat packs, e.g., 90*a* and 90*b* are brought together into confronting surface contact as seen most clearly in FIGURE 12.

Utilization of the novel modular construction described hereinbelow permits the greatest number of integrated circuits to be employed in the smallest possible dimensional area. This arrangement is exemplified by the structural configuration illustrated in FIGURES 10 through 14 inclusive.

A multi-pin header assembly 102, e.g., a rigid dielectric frame 104, is provided with a plurality of upstanding comb-like wall portions or teeth 106 wherein the vertically disposed members 106 separated by elongated rectangular open channels 108 provides a multi-slotted receptacle. A plurality of spaced electrically conducting pin members 110—four to each member 106—project from both sides of each member 106. The upper projecting portion 110a is relatively short while the lower projecting portion 110b is relatively long, for purposes hereinafter described. As seen in the inverted view of FIGURE 11 the bottom portion 112 of member 104 is provided with rows of elongated dielectric spacers 114 which may be secured as by being press-fitted around each of the rows of pins in surface contact with the bottom 112 for purposes which will be described hereinafter. A group of three coding pins 115 are disposed adjacent to the pins 110 and are suitably labeled for purposes set forth hereinafter.

Figure 12:
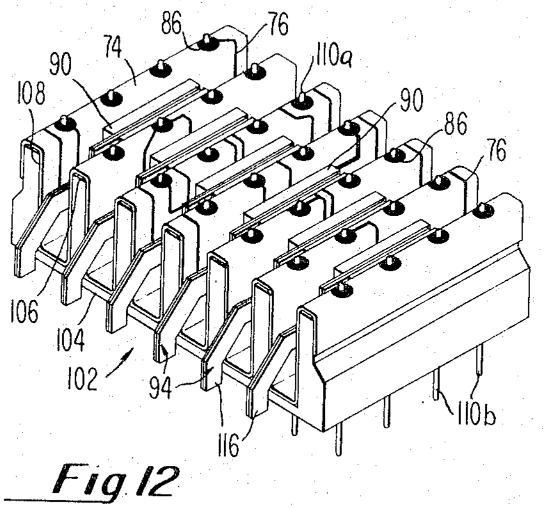
FIGURE 12 is a view of the assembly of FIGURE 10 with the printed wiring, integrated circuit members, ground plane and heat sink members arranged in place between the teeth of the comb-like structure.

The accordian folded assembly 72 of integrated circuit flat pack members 90 with their heat sink ground plane member 96 is nested within the channels or grooves 108 so as to bring the through holes or apertures 86 into engagement with the upper shorter projecting portions 110a of pins 110 and to bring the inwardly oriented portions 116 of the heat sink and ground plate tabs 96 into abutting surface contact as shown most clearly in FIGURE 12.

Thereafter, the assembly is hand or dip soldered to electrically and mechanically secure the shorter ends 110a of pins 110 to respective through hole junctions 86 completing construction of the structure of FIGURE 12.

The resulting structural configuration has the ground plane-heat sink tabs (now double in thickness as the result of the bonding operation) disposed perpendicular to the longer dimension of the assembly and projecting slightly away from the lower edge thereof for attachment purposes to be described shortly.

Figure 14:
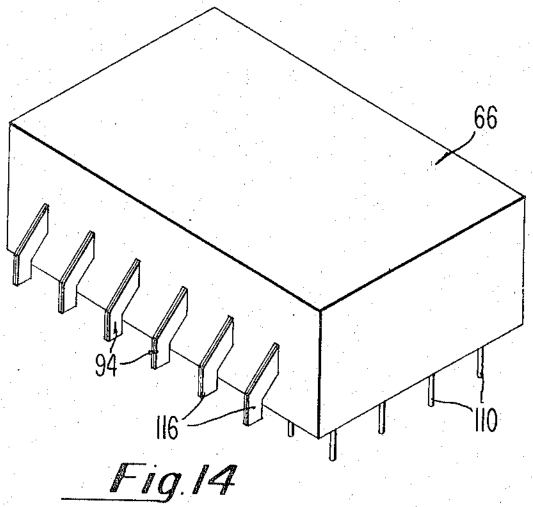
FIGURE 14 is a view of a completed integrated circuit network module embodying the present invention.
Figure 13:
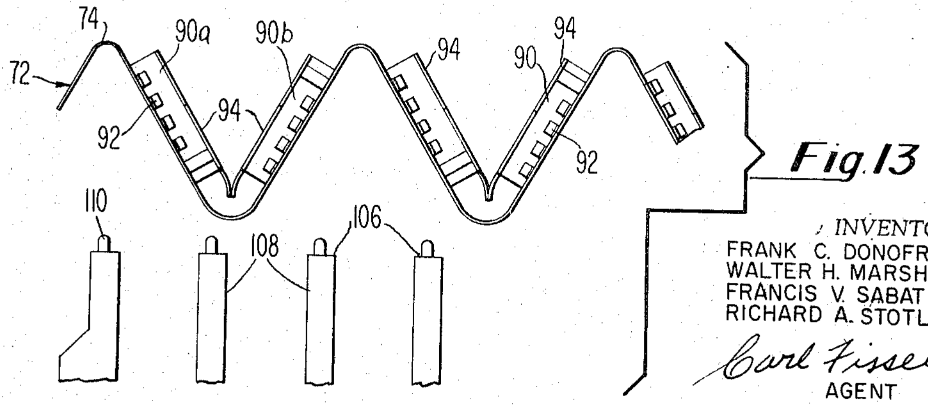
FIGURE 13 is a detail exploded view of a portion of the accordion pleated circuit assembly of FIGURE 12.

Thereafter, the individual integrated circuit assembly, as shown in FIGURE 12, is or may be encapsulated as by dipping the assembly into a dielectric material such as a clear epoxy, spray coated, potted or otherwise suitably sealed from the atmosphere to provide the completed unitary circuit network module structure 66 shown in FIGURE 14.

A central data processor unit 18 as set forth herein, may employ as many as 200 ir more modules 66 in 89 or more different circuit configurations. The involved and highly compacted wiring between individual integrated circuit modules 66 is accomplished by means now to be described in connection with the illustration of FIGURES 4, 5 and 6.

Each module card assembly 60, previously briefly referred to in connection with the description of FIGURES 1, 2 and 3, and 4, is, in its assembled condition, the vehicle or support for carrying the printed wiring 70 and associated circuit network modules. This construction affords a compact, unitized, pluggable, structural capability permitting a field operator or others to alter, change, rearrange and service the data processing apparatus in a manner not heretofore available to the computer manufacturing industry.

Figure 6B:
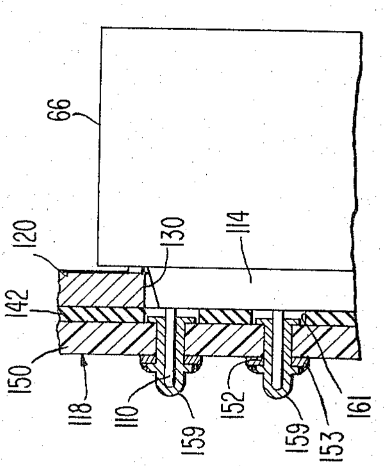
FIGURE 6B is a greatly enlarged sectional view of a modified form of plugable connectors for the circuit network modules of the present invention.
Figure 6A:
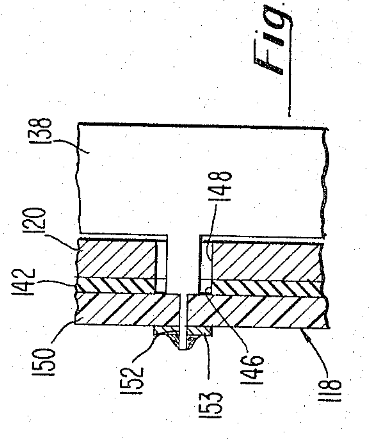
FIGURE 6A is a view along the line 6A—6A of FIGURE 6.
Figure 5:
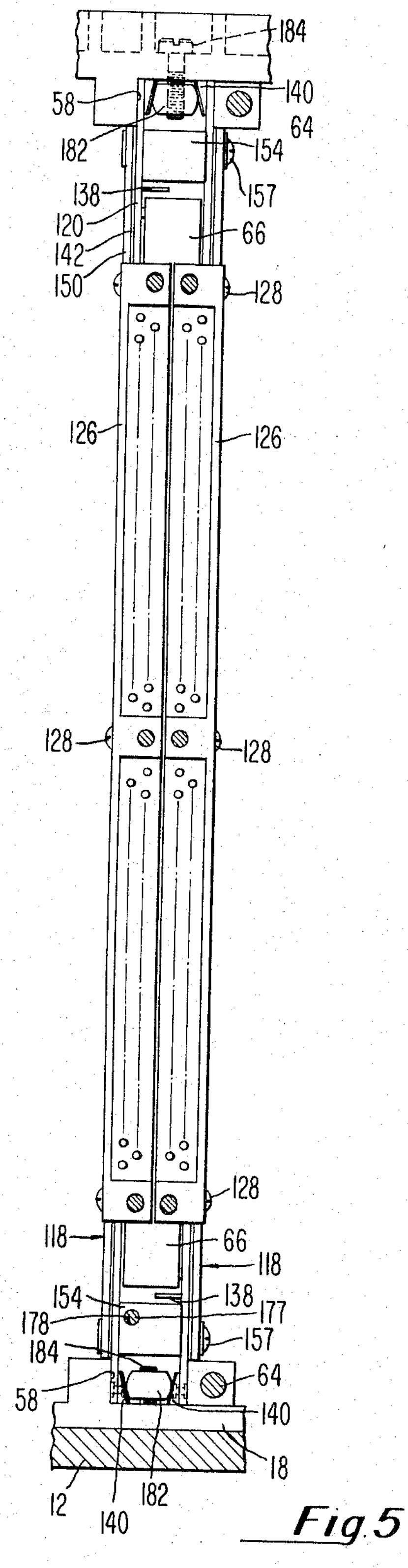
FIGURE 5 is a sectional view along the line 5—5 of FIGURE 4.
Figure 6:
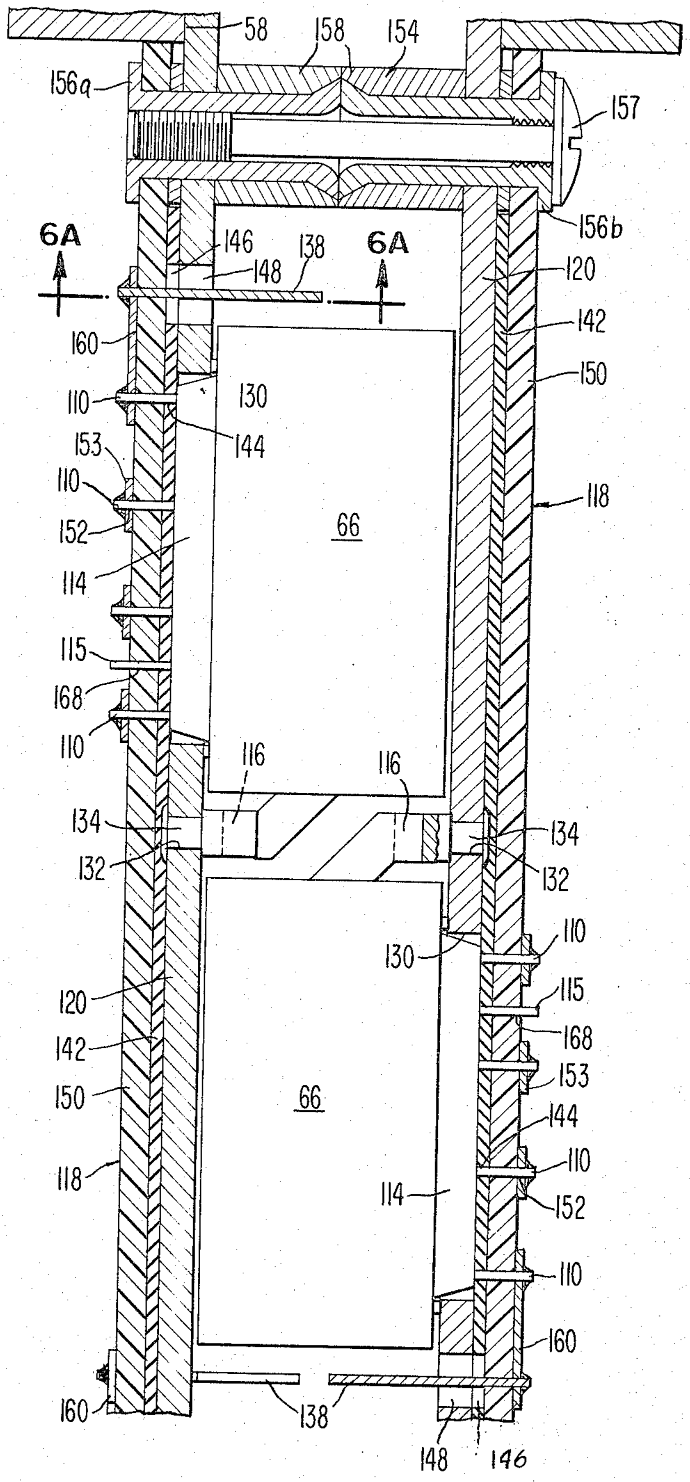
FIGURE 6 is a sectional view along the line 6—6 of FIGURE 4.

As seen most clearly in FIGURES 5 and 6, but also in the partially cut away view of FIGURE 4, each assembly 60 includes two compound circuit network module board members 118–118, the fabrication of which is now described in detail.

A flat planar conductive heat sink and ground plane member 120, of generally rectangular configuration and sufficiently thick to be self-supporting, is provided with an anodized surface coating 122. Pairs of oppositely disposed cutouts, notches or reliefs 124, FIGURE 4, are provided at each end thereof for receiving individual male printed wiring connectors 126, FIGURE 5, secured thereto as by bolts 128. Plate member 120 is further provided, as by milling or otherwise, with multiple, spaced apart rows of elongated, parallel spaced apertures 130. Rows of small circular apertures 132 (six to a row) adjacent to but slightly spaced from apertures 130 are adapted to receive slotted turret connectors 134, FIGURE 6. Along the opposite side of each row of apertures 130 there is a row of slightly larger spaced circular openings 136 adapted to receive the connections for a plurality of relatively heavy parallel conductors or busses 138, for purposes described hereafter. Busses 138 are connected together at one end by a similar heavy transverse buss 139.

On opposite parallel edges of member 120, disposed at right angles to connectors 126, are located elongated, rigid, wedge shaped strips 140, FIGURES 4 and 5, covered with an insulating coating material e.g., Rulon 140A manufactured by the Dixon Corporation, Bristol, R.I., and secured thereto as by rivets and extending for most of the length of member 120 as seen in FIGURE 4.

A flat, planar sheet of electrically insulating material 142, such as a synthetic rubber, is arranged in register with the member 120. Clearance openings 146 are cut into sheet 142 to register with similar clearance openings 148 provided in member 120, as shown in FIGURE 6, for purposes to be described herein. The insulating sheet 142 is bonded to the metal plate 120 by suitable adhesive such as silicone rubber cement, with the various apertures in each of the members 120 and 142 in strict and exact registration.

A double sided printed wiring panel member 150, of glass epoxy or other similar dielectric material is provided with the earlier mentioned electrical conductors forming printed wiring 70 on opposite sides thereof in a desired prearranged electrical circuit interconnecting wiring pattern, as seen most clearly in the lower center of FIGURE 4. A repeating pattern of apertures 152 is provided on the member 150 arranged so as to permit the pins of each module 66 to register therewith after passing through the elongated apertures 130 in member 120. The pattern of printed wiring is disposed on the member 150 in such fashion as to connect and/or interconnect various pins via the through holes 152 with other and different pins by means of circular pads 153 on one side only of member 150 permitting the panel to be soldered easily and efficiently. The circuits of the modules 66 are thus connected to the oppositely disposed edge located pairs of connectors 126 adjacent to notches 124. The printed wiring panel 150 is bonded to the insulating member 142 as by suitably applied silicone rubber adhesive not shown.

Disposed along opposite parallel edges and across the middle portion of the rigid metal member 120 are three elongated, rigid metal stiffener-separator members 154 which serve a multifold purpose. Member 154 is attached to member 120 as by rivets 155, FIGURE 4. Members 120, 142 and 150 are secured together into a unitary circuit network module board assembly by means of a rivet fasteners 156a and 156b, FIGURE 6. The circuit network module board assemblies 118—118 are attached together to form the unitary circuit network module card assemblies 60 by means of captive bolts 157 passed through the thickened upstanding portions 158. The thickened portions, three to each member 154, provide means for separating the pairs of circuit network module boards 118—118 as well as providing structural rigidity for the circuit boards 118.

Each circuit network module board 118 is provided with a plurality of circuit network modules 66 as earlier described, by pluggably inserting the pins 110 through the elongated slots 130 so as to cause the dielectric protuberances 114 surrounding each row of pins 110 to project through the apertures and seat against the surface of the insulating member 142. The pins 110 are forced through the rubber so as to extend into, through and slightly beyond the printed wiring panel 150 into electrical contact with associated conductors of the printed wiring 70.

A slightly modified configuration of the present apparatus is shown in FIGURE 6B. In this arrangement pluggable socket connectors 159 secured to the printed wiring panel 150 are received through clearance holes 161 in the rubber member 142. The pins 110 of modules 66 can thus be plugged into or removed from the receptacles 159 easily, quickly and efficiently. The connectors 159 are or may be soldered to the printed wiring 70 in any suitable manner.

However, when the pins 110 are to be semi-permanently secured to the wiring 70, each interior board of the assembly 118 is dip soldered as shown in FIGURE 6. The heat sink and ground tabs 116 are disposed in the slots of respective turret connectors 134 and soldered so as to provide a thermal as well as electrical connection to the major ground plane and heat sink member 120 as seen in FIGURE 6. This connection may also be fabricated as a pluggable joint. Electrical circuit power input means 160 is provided for applying suitable electrical potentials to the heavy conductors 138 and 139.

The pairs of circuit network module boards 118 are assembled together so that one row of circuit network modules 66, of one module board 118, is offset from the confronting row of adjacent modules 66 of the companion board 118 thereby providing the nested configuration as seen in FIGURE 6. The captive bolts 157 which secure the boards 118—118 together with the separators 154 spacing the boards apart as required, permit diassembly of this construction without danger of losing the fastener members.

In order that the overall assembly of circuit network module boards 118 may be accomplished easily and simply and, if need be, by relatively unskilled technicians and so as to avoid the possibility of mismating pairs of otherwise non-compatible circuit boards with one another, provision has been made for coding the boards, the assemblies 60, and the modules themselves. To this end, a pair of oppositely disposed locating or aligning pins 162 are disposed on the center stiffener member 154 of one board assembly 118 for mating engagement with locating holes (not shown) on the opposite complementary board assembly 118. A coding stud 164, the position or location of which varies from one module card assembly 60 to another as the electrical circuits themselves vary, is disposed along the center stiffener 154 for mating engagement with its complementary alignment aperture (not shown) on the mating board 118. In this fashion only one pair of circuit network module boards 118—118 are compatible with each other thus avoiding accidental or other mismatching of electrical circuits or logic.

Figure 11:
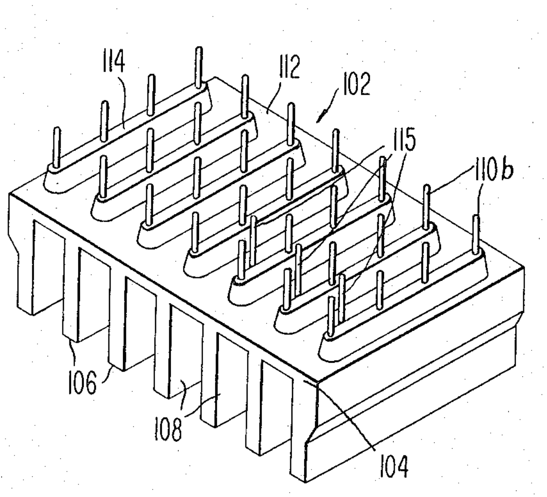
FIGURE 11 is a view of the assembly of FIGURE 10 in an inverted position.

A similar problem is avoided in connection with the mounting of modules 66 on their associated panels 150 by providing the earlier mentioned set of three coding pins 115, FIGURES 6 and 11, arranged adjacent to but spaced from the rows of pins 110 on each module assembly. By means of a prearranged program one or more of the pins 115 together with an associated pin 110 is clipped off close to the base of the header 104. Since no corresponding hole location is provided in the panel 150 at this point, only the pins of the selectively coded module project freely through associated pattern of apertures 152 and coding apparatus 168, FIGURE 6, in panel 150. The coding is prearranged to accommodate all of the necessary or desired circuit combinations planned for the particular data processing application.

With the circuit boards 118—118 in the unitary structure shown in FIGURE 5, the latter may now be slidably inserted into its associated container casting, FIGURE 3, along the oppositely disposed grooves 58 so as to engage the connectors 126 on the front (left in FIGURE 4) edge of the panels 150 with their respective mating female connectors 170 secured as by bolts 172 to the projections or busses 174 on the rear wall of the casting 56. Thereafter, the closure member 62 is attached so as to engage male connectors 126 on the front (right in FIGURES 3 and 4) of panel 150 with female connectors 176 bolted to member 62.

A coding pin 177, FIG. 5, pressed into the bottom of the closure casting 62, at various locations within a small well defined area is accepted in a registering prepositioned aperture 178 located in the end of member 154 as shown in FIGURE 5. This feature prevents the mismating of card assemblies avoiding accidental misarrangement of non-compatible circuits or logic.

Finally, the casting as a unitary assembly, is then slidably positioned along the grooves 28 of the base cover 30 so as to engage the male connector 65 with the female connector 34 on the front portion 40 of the rear upstanding frame 53. Captive shear pins 42 disposed through holes 180 in cover 62 to provide means for positively and accurately aligning the connectors with their associated receptacles thereby to prevent damage to the pins or accidental dislodgement thereof.

The oppositely disposed pairs of parallel wedge-shaped strips or rails 140—140 are operably associated with an individual cam member 182, and a bolt 184 accessible through the finned portion of the container housing. Rotation of each bolt 184 a slight amount wedges the cam 182 between adjacent wedge portions of the rails 140—140 securely immobilizing the circuit boards within the housing.

In this manner pressure and thermal contact is created between plate 120 and the walls of the grooves 58 of the container 56. The action completes a conducting heat (thermal) pathway from the card plates 120, FIGURE 5, to the fins 14 on the container 56. Heat generated at the modules 66 is thus lead via heat sink 94 to the turret 134, to plate 120, to fins 14 to the atmosphere, for dissipation therein. (Each casting 56 is provided with a hard anodic coating 2–3 mils thick.)

Figure 4A:
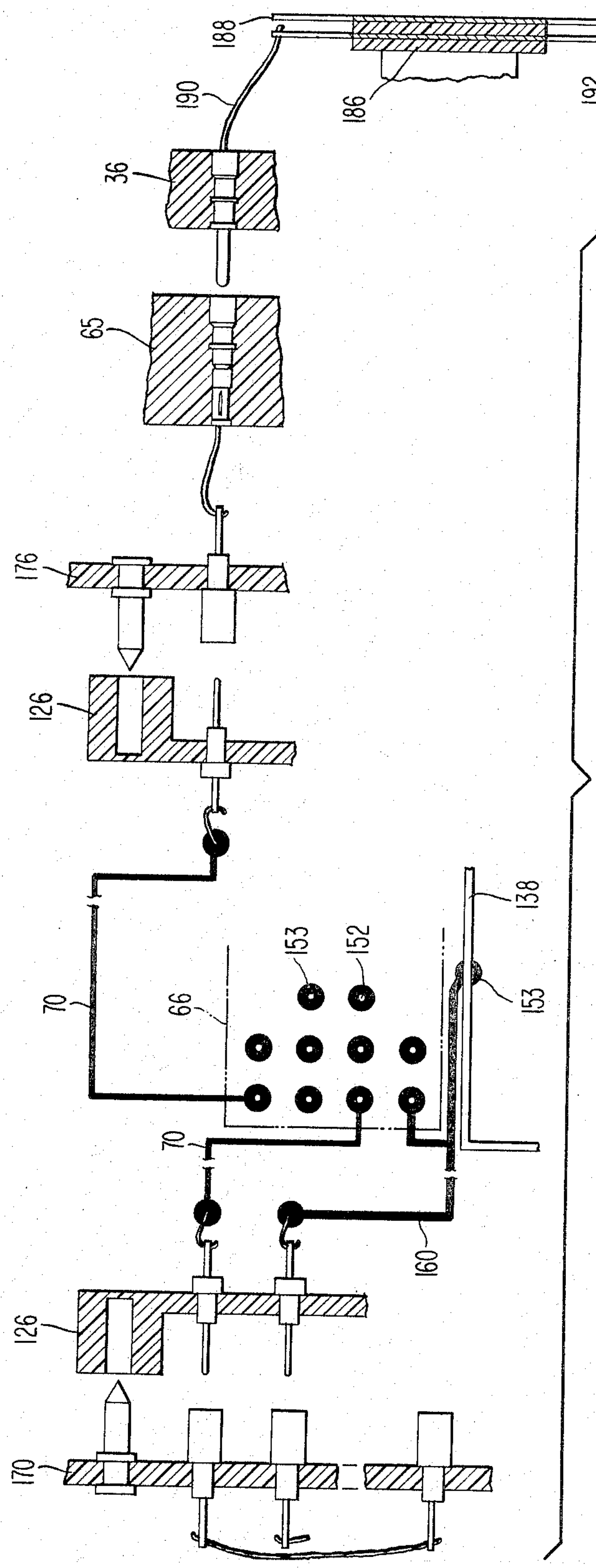
FIGURE 4A is an idealized diagrammatic view illustrating the overall interconnection scheme, front to back, of the apparatus illustrated in FIGURE 4.

Secured as by bolts, to the rear surface of the wall plate 40, FIGURES 4 and 4A, is a dielectric voltage and ground distribution buss 186 carrying a plurality of conductive strips 188, e.g., copper. The strips are connected at one end to conductors 190 which are connected to the pins of connector 36. The opposite ends of the strips 188 are connected to conductors 192 which interconnect the strips to the power supply module located in the base 12, the latter supplying all of the various electrical potentials for operation of the apparatus embodying the present invention. Access to the rear interior of the member 53 is provided by means of a cover plate 194 FIG. 4 secured to the rear upstanding portion of the base 12 by means of screws.

The all-integrated-circuit arithmetic unit is the central element in the present modular packaging system making the latter adaptible for an extremely wide range of computer applications. Combinations of four different module packages (unitary assemblies) can be made up easily and efficiently into computers with memory capacities ranging from 4,096 to 65,536 words. A basic computer package consisting of a 4,096 memory, central data processor, input-output module and power supply has a volume of 1.7 cubic feet and weights approximately 100 pounds.

What is claimed is:

1. Micro-miniaturized modular data processing apparatus comprising:

(a) one or more integrated electrical circuit network modules, each of said modules including at least one electrical circuit for use in processing data, (b) means mounting said network modules in a desired prearranged pattern on an electrical circuit carrying member effectively forming a network assembly; a common ground plane heat sink for said apparatus, said modules and said circuit carrying member being operably associated with said common ground plane-heat sink member effective to dissipate heat from said circuits while simultaneously providing electrical ground potential levels for said apparatus, (c) means for electrically interconnecting one circuit carrying member with another similar circuit carrying member thereby to form a unitary network assembly, and (d) means, including electrical current and signal input and output means, together with means providing a sealed container with which said network assembly is operably associated, for demountably, pluggably securing said network assembly within said sealed container, thereby providing an enclosed, self-contained unitary data processing module.

2. Micro-miniaturized modular data processing apparatus comprising:

(a) one or more integrated electrical circuit network modules, each of said modules including at least one electrical circuit for use in processing data, (b) means mounting said network modules in a desired prearranged pattern on a printed wiring electrical circuit carrying member effectively forming a network assembly, a common ground plane heat sink for said apparatus, said modules and said circuit carrying member being operably associated with said common ground plane-heat sink member effective to dissipate heat from said circuits while simultaneously providing electrical ground potential levels for said apparatus, (c) printed wiring connector means for individually interconnecting one circuit carrying member with another circuit carrying member forming a unitary network assembly, and (d) means, including electrical current and signal input and output means, together with means providing a sealed container with which said network assembly is operably associated, for demountably, pluggably securing said network assembly within said sealed container, thereby providing an enclosed, self-contained, unitary data processing module.

3. Micro-miniaturized modular data processing apparatus comprising:

(a) a plurality of integrated electrical circuit modules, each of said modules including one or more monolithic circuits for use in data processing, (b) means mounting said circuit modules in a desired prearranged pattern on a printed wiring electrical circuit carrying member, (c) a common ground plane-heat sink member operably associated with said circuit modules and said circuit carrying member, (d) electrically insulating means interposed in surface contact between said printed wiring member and said heat sink and ground plane member, (e) printed wiring connector means individually interconnecting the circuits of said circuit carrying member and the circuits of said modules thereby providing a unitary network assembly, and (f) means, including electrical circuit and signal input and output means together with means providing a sealed container with which said network assembly is operably associated for demountably, pluggably securing said network assembly within said sealed container thereby providing an enclosed self-contained unitary data processing module.

4. Micro-miniaturized modular data processing apparatus comprising:

(a) a plurality of integrated electrical circuit modules, each of said modules including a plurality of monolithic circuits for use in data processing, (b) means mounting said circuit modules in spaced apart rows in a desired prearranged pattern on a printed wiring electrical circuit carrying member effectively forming a network assembly, (c) a common ground plane-heat sink member operably associated with said circuit modules and said printed wiring member, (d) electrically insulating means interposed in surface contact between said printed wiring member and said heat sink and ground plane member, (e) printed wiring connector means individually interconnecting the circuits of said circuit carrying member and the circuits of said modules thereby providing a unitary network assembly, (f) electrical circuit signal input and output means with which said network assembly is operably associated together with means providing a sealed container including means for demountably, pluggably securing said network assembly within said sealed container thereby providing an enclosed, self-contained unitary data processing module, and (g) means for bringing said heat sink and ground plane member into conductive contact with said container effective to dissipate any heat generated by said circuits into the surrounding atmosphere.

5. Micro-miniaturized modular data processing apparatus comprising:

(a) a plurality of integrated electrical circuit network modules, each of said modules including a plurality of electrical circuits, heat sink and ground plane means for each of said modules, (b) means mounting said network modules on and electrically connecting the same into a prearranged pattern of printed wiring circuits effectively forming a network assembly, (c) means providing a common ground plane and heat sink to which the heat sink and ground plane means of the circuit modules are operably connected effective to dissipate heat from the electrical circuits while simultaneously providing a ground potential level therefor, (d) circuit connector means individually interconnecting the circuits of said modules with one another via said printed wiring circuits effectively forming a unitary electrical circuit network assembly, (e) power supply means, and (f) means mounting said electrical circuit network assembly to said power supply means for demountable, pluggable insertion and removal therefrom thereby providing a unitary self-contained data processing module.

6. Micro-miniaturized modular data processing apparatus comprising:

(a) a plurality of integrated electrical circuit network modules, each of said modules including a plurality of electrical circuits, a heat sink and ground plane member for each circuit of said modules, (b) means mounting said network modules on and electrically connecting the same into a prearranged pattern of printed wiring circuits effectively forming a network assembly, (c) means providing a common ground plane and heat sink to which the heat sink and ground plane members of each module are operably connected effective to dissipate heat from the electrical circuits while simultaneously providing a ground potential level therefor, (d) circuit connector means individually interconnecting the circuits of said modules with one another via said printed wiring circuits effectively forming a unitary electrical circuit network assembly, (e) power supply means, and (f) means mounting said electrical circuit network assembly to said power supply means for demountable, pluggable, insertion and removal therefrom thereby providing a unitary self-contained data processing module.

7. Micro-miniaturized modular data processing apparatus comprising:

(a) a first plurality of electrical circuit modules including common heat sink and ground plane means therefor, (b) a second plurality of electrical circuit modules including common heat sink and ground plane means therefor, (c) means mounting said modules in spaced rows on respective printed wiring panel members, each panel member including a common planar heat sink-ground plane member operatively associated therewith, (d) means connecting the heat sink and ground plane means of said modules to a respective common planar heat sink and ground plane member, (e) means mounting said printed wiring members in confronting spaced relationship so that one row of modules of one printed wiring member is nested between the adjacent row of modules of the confronting printed wiring member thereby forming a unitary circuit assembly, a sealed container for said circuit assembly, and (f) means mounting said circuit assembly in said sealed container including means therein effective to cause said assembly to make thermal contact with said container, thereby to dissipate heat from said modules into the atmosphere.

8. Micro-miniaturized modular data processing apparatus comprising:

(a) a first plurality of electrical circuit modules each module including a common heat sink and ground plane means, (b) a second plurality of electrical circuit modules each module including common heat sink and ground plane means, (c) means mounting said modules in spaced rows on a respective printed wiring panel member, each panel member including a common planar heat sink-ground plane member operatively associated therewith, (d) means connecting the heat sink and ground plane means of each of said modules to a respective common planar heat sink and ground plane member of its associated printed wiring member, (e) means mounting said printed wiring members in confronting spaced relationship so that one row of modules of one printed wiring member is offset from and nested between an adjacent row of modules on a confronting printed wiring member thereby forming a unitary circuit assembly, a sealed container for said circuit assembly, and (f) means mounting said circuit assembly in said sealed container including cam means therein effective to move said assembly into thermal contact with said container thereby to dissipate heat from said modules into the atmosphere.

9. Micro-miniaturized modular data processing apparatus, (a) a first printed wiring network module board assembly, including a plurality of rows of integrated electrical circuit modules provided with heat sink and ground plane members, (b) a second printed wiring network module board assembly, including a plurality of rows of integrated electrical circuit modules provided with heat sink and ground plane members.

(c) a common heat sink and ground plane member for each said assembly, (d) means connecting the heat sink and ground plane member of each assembly with respective common heat sink and ground plane members of the modules, (e) means connecting said first and second assemblies into a unitary module card assembly including pluggable, interconnecting means therefor with the modules of said first assembly being offset and nested relative to the modules of said second assembly, (f) each of said first and second assemblies including coding means enabling the accurate registration and mating jointure of each of the two assemblies effective to avoid mismatching of electrical circuits thereon, and (g) a container for said assembly including means for sealing the same from the atmosphere.

10. Micro-miniaturized modular data processing apparatus, (a) a first printed wiring network module board assembly, including a plurality of rows of integrated electrical circuit modules provided with heat sink and ground plane members, (b) a second printed wiring network module board assembly, including a plurality of rows of integrated electrical circuit modules provided with heat sink and ground plane members, (c) a common heat sink and a ground plane member for each said assembly, (d) means connecting the heat sink and ground plane member of each assembly with respective common heat sink and ground plane members of the modules, (e) captive, demountable means connecting said first and second assemblies into a unitary module card assembly with the modules of said first assembly being offset and nested relative to the modules of said second assembly, (f) each of said first and second assemblies including coding means enabling the accurate registration and mating of the two assemblies effective to avoid mismatching of electrical circuits thereon, (g) a container for said assembly including means for sealing the same from the atmosphere, and (h) coding means on said unitary assembly registering with coding means on said sealing means preventing mis-insertion of non-compatible assemblies in the same container.

11. Micro-miniaturized modular data processing apparatus comprising:

(a) a dielectric mounting member including spaced rows of vertical wall forming members, (b) each of said wall members being provided with a row of conductors extending therethrough, (c) an electrically insulating printed wiring assembly carrying one or more printed conductors thereon and being provided with at least one monolithic circuit member disposed thereon in operative relationship to said printed wiring, (d) thermal and electrical conductive means arranged in operative association with said circuit and including means for pluggably attaching the same to external thermally conductive means effective to dissipate heat from said circuit into the atmosphere, and (e) electrically insulating means operably associated with said rows of electrical conductors providing mounting and spacing means permitting the same to be pluggably mounted to associated electrical circuitry.

12. Micro-miniaturized modular data processing apparatus comprising:

(a) a dielectric mounting member including spaced rows of vertical wall forming members, (b) each of said wall members being provided with a row of conductors extending therethrough, (c) an electrically insulating printed wiring assembly carrying one or more printed conductors thereon and being provided with at least one monolithic circuit member disposed thereon in operative relationship to said printed wiring, (d) thermal and electrical conductive means arranged in operative association with said circuit and including means for pluggably attaching the same to external thermally conductive means effective to dissipate heat from said circuit into the atmosphere, (e) electrically insulating means operably associated with said rows of electrical conductors providing stand-off mounting and spacing means permitting the same to be pluggably mounted to associated electrical circuitry, and (f) electrically non-conductive material encapsulating said assembly sealing the same from the atmosphere.

13. Micro-miniaturized modular data processing apparatus comprising:

(a) a dielectric supporting member, including a plurality of spaced wall-like members, each wall member being provided with a row of conductive pins extending therethrough providing pluggable attachment means therefor, (b) an electrically insulating printed wiring member provided with printed conductors on both sides thereof carrying one or more integrated electrical circuits arranged in operative association with said printed wiring, (c) a common ground plane and heat sink for said circuits including means for attachment to an external heat dissipating member, (d) said printed wiring member being accordion folded back and forth upon itself to bring the heat sinks of adjacent circuits into confronting surface contact and mounted on said supporting member with pairs of electrical circuits disposed between adjacent parallel wall members and with pairs of heat sinks arranged for external conductive attachment to associated conductive means for dissipation of heat from said circuits into the atmosphere, and (e) coding means for said apparatus including one or more electrical conductors offset from and adjacent to said pluggable conductors and arranged in a predetermined pattern permitting the assembly to be correctly oriented with other associated printed wiring assemblies, avoiding accidental mismatching of circuits.

14. Micro-miniaturized modular data processing apparatus comprising:

(a) an elongated, flat, dielectric member carrying printed wiring conductors on both sides thereof, interconnecting groups of printed wiring pads in a prearranged, repeating electrical circuit pattern, (b) integrated electrical circuit members electrically operably associated with said circuit pattern, (c) thermal, electrically conductive heat sink and ground plane members operably associated with each of said integrated circuits and including connection means integral therewith, a common ground plane and heat sink member for said assembly, (d) a comb-like dielectric support member having spaced vertically extending wall members, each one of which is provided with a row of conductive pins for pluggable interconnection with other associated circuitry, said elongated, flat dielectric member being folded back and forth upon itself in a serpentine manifold arrangement with certain of its folds nested within the spaces between said walls and others of its folds overlying said walls for electrical connection to the pins of said member, the heat sink and ground plane members of adjacent pairs of circuit members being arranged in confronting surface contact and disposed at right angles to the long dimension of said support member for external connection to said associated common ground plane and heat sink member, and (e) means encapsulating said support member leaving only the conductive pins and the heat sink and ground plane members exposed thereby forming a solid unitary module assembly.

15. Micro-miniaturized modular data processing apparatus comprising:

(a) an elongated, flat dielectric member carrying printed wiring conductors on both sides thereof, interconnecting groups of printed wiring pads in a prearranged, repeating electrical circuit pattern, and parallel spaced rows of plated through holes, (b) integrated electrical circuit members electrically operably associated with said circuit pattern, (c) thermal, electrically conductive heat sink and ground plane members operably connected to each of said integrated circuit members and including interconnection tabs integral therewith, and extending away therefrom, (d) a comb-like dielectric support member having spaced vertically extending wall members, each one of which is provided with a row of conductive pins for pluggable interconnection with other associated circuitry, said elongated, flat dielectric member being folded back and forth upon itself in a serpentine manifold arrangement with certain of its folds nested within the spaces between said walls and others of its folds overlying said walls so that said pins project through said holes for electrical connection of one end of the pins of each row of pins on said member to the plated through holes, the heat sink and ground plane members of adjacent pairs of integated circuit members being arranged in confronting surface contact and disposed at right angles to the long dimension of said support member, an associated common ground plane and heat sink member conductively connected to said heat sink and ground plane members of said integrated circuit members, and (e) means encapsulating said support member leaving only the conductive pins and the heat sink and ground plane members exposed thereby forming a solid unitary module assembly.

References Cited

UNITED STATES PATENTS

| | | | |
|---|---|---|---|
| 3,152,288 | 10/1964 | Mittler | 317—99 |
| 3,200,296 | 8/1965 | Bruestle | 317—100 |
| 3,267,333 | 8/1966 | Schultz | 317—100 |
| 3,200,686 | 7/1963 | Johnson et al. | 317—101 |

ROBERT K. SCHAEFER, *Primary Examiner.*

M. GINSBURG, *Assistant Examiner.*